(12) United States Patent
Mylaraswamy et al.

(10) Patent No.: US 8,285,438 B2
(45) Date of Patent: Oct. 9, 2012

(54) METHODS SYSTEMS AND APPARATUS FOR ANALYZING COMPLEX SYSTEMS VIA PROGNOSTIC REASONING

(75) Inventors: Dinkar Mylaraswamy, Fridley, MN (US); George Daniel Hadden, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 513 days.

(21) Appl. No.: 12/619,260

(22) Filed: Nov. 16, 2009

(65) Prior Publication Data

US 2011/0118905 A1    May 19, 2011

(51) Int. Cl.
G01M 17/00 (2006.01)
G06F 19/00 (2006.01)
(52) U.S. Cl. ............ 701/29.9; 701/29.1; 701/29.2; 701/29.3; 701/29.4; 701/29.5; 701/29.6; 701/29.7; 701/29.8
(58) Field of Classification Search .......... 701/1, 3, 701/29.1–32.1, 32.7, 32.8, 32.9, 33.1, 33.5, 701/34.2, 179–185; 702/179–185; 455/423; 340/425.5, 438, 439, 572.1, 525
See application file for complete search history.

(56) References Cited

U.S. PATENT DOCUMENTS

| 5,010,487 A | 4/1991 | Stonehocker |
| 5,544,308 A | 8/1996 | Giordano et al. |
| 5,592,614 A | 1/1997 | Peters |

(Continued)

FOREIGN PATENT DOCUMENTS

EP    1455313 A1    9/2004
(Continued)

OTHER PUBLICATIONS

EP Search Report, EP 10186328.0-2206 dated Mar. 23, 2011.
EP Communication, EP 10186328.0-2206 dated Jul. 4, 2011.

*Primary Examiner* — Khoi Tran
*Assistant Examiner* — Bhavesh V Amin
(74) *Attorney, Agent, or Firm* — Ingrassia Fisher & Lorenz, P.C.

(57) ABSTRACT

Methods and apparatus are provided for analyzing a complex system that includes a number of subsystems. Each subsystem comprises at least one sensor designed to generate sensor data. Sensor data from at least one of the sensors is processed to generate binary evidence of a sensed event, and complex evidence of a sensed event. The complex evidence has more sophisticated mathematical properties than the binary evidence. The complex evidence comprises one or more of: a condition indicator (CI), a health indicator (HI), and a prognostic indicator (PI). A system fault model (SFM) is provided that defines statistical relationships between binary evidence, complex evidence, and an underlying failure mode (FM) that is occurring in the complex system. The binary evidence and the complex evidence are processed to identify failure modes taking place within one or more of the subsystems. Based on the binary evidence and the complex evidence and the SFM, diagnostic conclusions can be generated regarding adverse events that are taking place within the complex system, and prognostic conclusions can be generated regarding adverse events that are predicted to take place within the complex system.

20 Claims, 8 Drawing Sheets

U.S. PATENT DOCUMENTS

| | | |
|---|---|---|
| 5,919,267 A | 7/1999 | Urnes et al. |
| 6,240,343 B1 | 5/2001 | Sarangapani et al. |
| 6,643,569 B2 | 11/2003 | Miller et al. |
| 6,868,319 B2 | 3/2005 | Kipersztok et al. |
| 6,941,202 B2 | 9/2005 | Wilson et al. |
| 7,136,794 B1 | 11/2006 | Bechhoefer |
| 7,376,499 B2 | 5/2008 | Salman et al. |
| 7,499,777 B2 | 3/2009 | Grichnik et al. |
| 7,529,643 B2 | 5/2009 | Nyberg |
| 2005/0119840 A1 | 6/2005 | Astley et al. |
| 2006/0126608 A1 | 6/2006 | Pereira et al. |
| 2006/0235707 A1 | 10/2006 | Goldstein et al. |
| 2007/0050104 A1 | 3/2007 | Wallace et al. |

FOREIGN PATENT DOCUMENTS

| | | |
|---|---|---|
| EP | 2063398 A2 | 5/2009 |
| GB | 2450241 A | 12/2008 |

METHODS SYSTEMS AND APPARATUS FOR ANALYZING COMPLEX SYSTEMS VIA PROGNOSTIC REASONING

TECHNICAL FIELD

The present invention generally relates to diagnosis and prognosis of complex systems, and more particularly relates to a monitoring system and reasoning architecture for identifying, diagnosing and prognosing adverse events or failures that might be occurring in a complex system and/or in one or more of its subsystems.

BACKGROUND

In complex systems that include multiple subsystems, such as an electrical plant or a vehicle such as a ship, aircraft or spacecraft, it is desirable to identify adverse events or failures that might be occurring in one or more of its subsystems. For instance, vehicle health monitoring systems are often used to monitor various health characteristics of vehicle systems.

FIG. 1 is a block diagram that illustrates a conventional complex system 5 and analysis system 15. The complex system 5 includes a number (1 ... N) of subsystems 10, and each subsystem 10 includes one or more sensors or other monitors (not shown). Each sensor/monitor can generate sensor data that is used by the analysis system 15. The analysis system 15 includes a number of simple diagnostic and prognostic monitors (SDPMs) 20 and a maintenance computer (MC) 25.

Each SDPM 20 can receive sensor data from one or more of the subsystems, and executes a built-in-test (BIT) on that sensor data to interpret the sensor data and generate a BIT result. Each BIT result is evidence that is binary in nature (e.g., yes/no, on/off, 1/0, etc.) or "binary evidence" of a sensed event or condition observed by the sensor/monitor. The BIT result(s) are provided to an inferencing engine 30 of the MC 25. The inferencing engine 30 includes a prognostic reasoner (PR) module 35 that implements algorithms for analyzing the BIT result(s) and generating answers or conclusions regarding events taking place at one or more of the complex system's subsystems. However, the PR module 35 does not normally provide optimal support for diagnostics and prognostics pertaining to the complex system or its subsystems.

Notwithstanding these advances in complex system analysis technology, it is desirable to provide improved analysis systems for use with such complex systems. Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatus are provided for analyzing a complex system that includes a number of subsystems. Each subsystem comprises at least one sensor designed to generate sensor data. Sensor data from at least one of the sensors is processed to generate binary evidence of a sensed event, and complex evidence of a sensed event. The complex evidence has more sophisticated mathematical properties than the binary evidence. The complex evidence comprises one or more of: a condition indicator (CI), a health indicator (HI), and a prognostic indicator (PI). A system fault model (SFM) is provided that defines statistical relationships between binary evidence, complex evidence, and an underlying failure mode (FM) that is occurring in the complex system. The binary evidence and the complex evidence are processed to identify failure modes taking place within one or more of the subsystems. Based on the binary evidence and the complex evidence and the SFM, diagnostic conclusions can be generated regarding adverse events that are taking place within the complex system, and prognostic conclusions can be generated regarding adverse events that are predicted to take place within the complex system.

In accordance with one embodiment, a method is provided for analyzing a complex system that includes a number of subsystems. Each subsystem comprises at least one sensor designed to generate sensor data. Sensor data from at least one of the sensors is processed to generate binary evidence of a sensed event, and complex evidence of a sensed event. The complex evidence has more sophisticated mathematical properties than the binary evidence. The complex evidence comprises one or more of: a condition indicator (CI), a health indicator (HI), and a prognostic indicator (PI). A system fault model (SFM) is provided that defines statistical relationships between binary evidence, complex evidence, and an underlying failure mode (FM) that is occurring in the complex system. The binary evidence and the complex evidence are processed to identify failure modes taking place within one or more of the subsystems. Based on the binary evidence and the complex evidence and the SFM, diagnostic conclusions can be generated regarding adverse events that are taking place within the complex system, and prognostic conclusions can be generated regarding adverse events that are predicted to take place within the complex system.

In one implementation, binary evidence of a sensed event can be generated by executing a built-in-test (BIT) on the sensor data. Each instance of binary evidence generated by a particular built-in-test (BIT) comprises "BIT" evidence that implicates an ambiguity group of failure modes. The SFM captures a relationship between the FM and the BIT evidence as an exhibit.

In one implementation, complex evidence of a sensed event can be generated by processing sensor data from a multivariate signal to generate a CI, a HI and/or a PI. A CI comprises: derived parametric data that provides partial evidence towards an ambiguity group of failure modes. The mathematical relationship between the CI and the FM can be represented as a low-order polynomial. A health indicator (HI) comprises partially-summarized diagnostic conclusions that provide probabilistic evidence for an ambiguity group of failure modes and contain a reference to an ambiguity failure mode set. The mathematical relationship between an HI and the FM can be represented as a probability density function. A prognostic indicator (PI) comprises partially-summarized evidences that indicate a future evolution of a HI over a future time period. In one implementation, a PI comprises Prognostic Vectors (PVs) comprising a set of one or more ordered pair of time and probability that indicate complex time to failure. The relationship between a PI and the FM can be represented as a time series auto regression model.

In addition to binary evidence and complex evidence, the SFM may also include other elements, such as, repair action elements, function elements, optional elements and/or related failure mode elements. Each repair action element represents corrective repair action for restoring the complex system back to an original state in which the complex system met specified requirements. In the SFM, the relationship between the each repair action element and the FM is represented as a corresponding corrective repair action for restoring the corresponding complex system back to the original state. Each function element represents activities performed by a system or a subsystem. In the SFM, the relationship between each optional element and the FM is represented by impacts between the FM and the optional element, wherein the mathematical format of the impacts between the optional element and the FM can be represented as a binary number. Each related failure mode element represents a cascade relationship between failure modes that are caused by other failure modes. In the SFM, the relationship between each related failure mode element and the FM is represented as a cascade between FM and related failure mode element.

In accordance with another embodiment, a system is provided that includes a complex system and an analysis system. The complex system includes a number of subsystems each having at least one sensor designed to generate sensor data. In one non-limiting implementation, the complex system may be, for instance, a vehicle, such as an aircraft or a spacecraft, and the analysis system may be an Integrated Vehicle Health Management (IVHM) system.

The analysis system can include one or more simple diagnostic and prognostic monitors (SDPMs), one or more advanced diagnostic and prognostic monitors (ADPMs) and a maintenance computer (MC). The SDPM (s) are each designed to process sensor data from at least one of the sensors and generate binary evidence of a sensed event. The ADPM(s) are each designed to process sensor data from at least one of the sensors and generate at least one form of complex evidence of a sensed event. The complex evidence can include one or more of: a condition indicator (CI), a health indicator (HI), and a prognostic indicator (PI).

The maintenance computer (MC) is communicatively coupled to the SDPM(s) and the ADPM(s). The MC includes an advanced diagnostics and prognostics reasoner (ADPR) module. The ADPR module is designed to process the binary evidence and the complex evidence to identify failure modes taking place within one or more of the subsystems of the complex system. To do so, the ADPR module includes a system fault model (SFM) that defines proabilistic relationships between binary evidence, complex evidence, and an underlying failure mode (FM) that that is occurring in the complex system. The ADPR module also includes a diagnostic processing module (DPM) that is designed to generate, based on the binary evidence and the complex evidence and the SFM, diagnostic conclusions regarding adverse events that are taking place within the complex system, and a prognostic processing module (PPM) that is designed to generate, based on the binary evidence and the complex evidence and the SFM, prognostic conclusions regarding adverse events that are predicted to take place within the complex system.

BRIEF DESCRIPTION OF THE DRAWINGS

The present invention will hereinafter be described in conjunction with the following drawing figures, wherein like numerals denote like elements.

DETAILED DESCRIPTION

Figure 1:
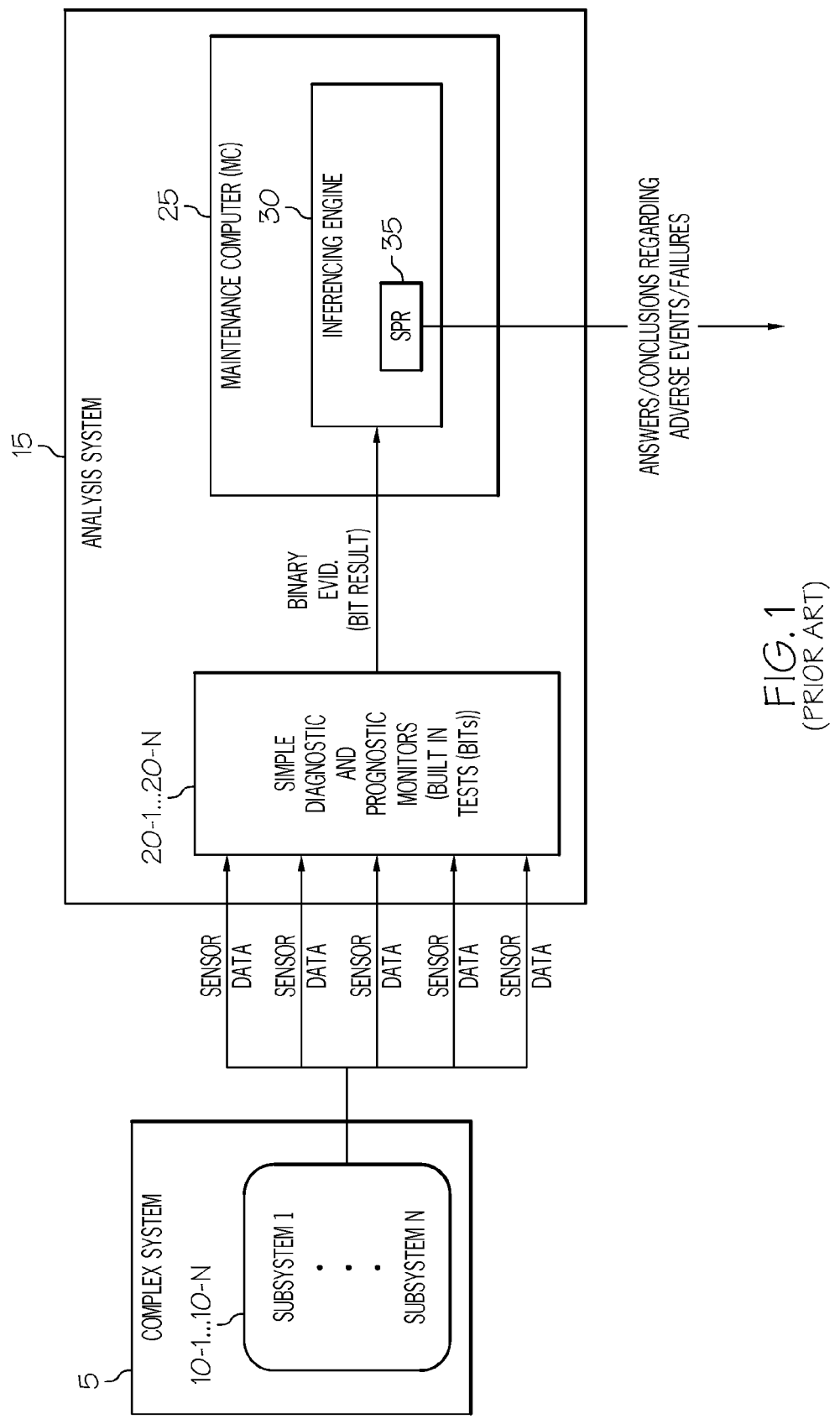
FIG. 1 is a block diagram that illustrates a conventional complex system and analysis system.

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. Furthermore, there is no intention to be bound by any theory presented in the preceding background or the following detailed description.

Overview

One drawback of the analysis system 15 described above with reference to FIG. 1 is that the SDPMs 20 used to interpret sensor data each generate simple binary evidence (i.e., BIT results) only. However, in many cases, simple binary evidence is not good enough to identify certain adverse events or failures in the complex system 5 or one of its sub-systems 10. For example, simple binary evidence is insufficient to identify "complex adverse events" such as incipient faults (i.e., extremely slow degradation in performance), slow progressing events where there is a gradual degradation in performance, intermittent or recurring faults, cascading faults that are manifested in other subsystems, and quickly progressing events where performance rapidly degrades from the onset. In addition, the SPR module 35 is not designed to handle "sophisticated evidence" of these "complex adverse events." Accordingly, it would be desirable to provide methods, systems and apparatus designed to identify "complex adverse events" such as those noted above, and designed to generate diagnosis or prognosis conclusions regarding these complex adverse events.

Before describing in detail embodiments that are in accordance with the present invention, it should be observed that the embodiments reside primarily in combinations of method steps and apparatus components related to a monitoring system and reasoning architecture for performing diagnostics and prognostics including identifying, diagnosing and prognosing adverse events or failures that might be occurring in a complex system and/or in one or more of its subsystems. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for performing diagnostics and prognostics (including identifying, diagnosing and prognosing adverse events), as described herein. For instance, in one implementation the modules can be implemented as software that runs on a microprocessor or microcomputer. As such, these functions may be interpreted as steps of a method for identifying, diagnosing and prognosing adverse events. Alternatively, some or all functions could be implemented by a state machine that has no stored program instructions, or in one or more ASICs, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Among other things, the disclosed embodiments implement Intelligent Data Collection (IDC) techniques that can detect and/or identify trigger conditions and then record a specified set of parametric measurements for use in feature extraction or by advanced diagnostic and prognostic monitors (ADPMs) at the subsystem level. The ADPMs are input-output computation blocks that implement diagnostic and prognostic algorithms. The ADPMs are designed to operate on input evidences (i.e., partial, heterogeneous, and asynchronous parametric evidence) provided by sensors to generate enriched, sophisticated or complex evidence (CE) that are referred to herein as condition indicators, health indicators and prognostic indicators. This CE can be generated by ADPMs either periodically or through an active query mechanism. The CE can be interpreted by an advanced prognostics reasoner (APR) module and used for system-level reasoning.

A hierarchical system fault model (SFM) for system-level reasoning works in conjunction with the advanced prognostic reasoning module (APR) to process the CE and generate diagnostic conclusions and prognostic conclusions.

For instance, temporal and spatial fusion techniques are implemented at the ADPR module to account for temporal redundancy and topological connectivity among subsystems. The former reduces chatter, while the latter accounts for physical cascades. Applying these techniques generates less periodic, but more consolidated evidences for the next step in the fusion process.

Causal and functional fusion techniques are then implemented at the ADPR module to account for causal dependency due to exchange of signals such as mass, momentum, pressure, torque, etc. By following the causal links, these techniques can be used to evaluate potential root causes that explain all the evidence collected at any point in time and generate prognostic conclusions based on that evidence.

Figure 2:
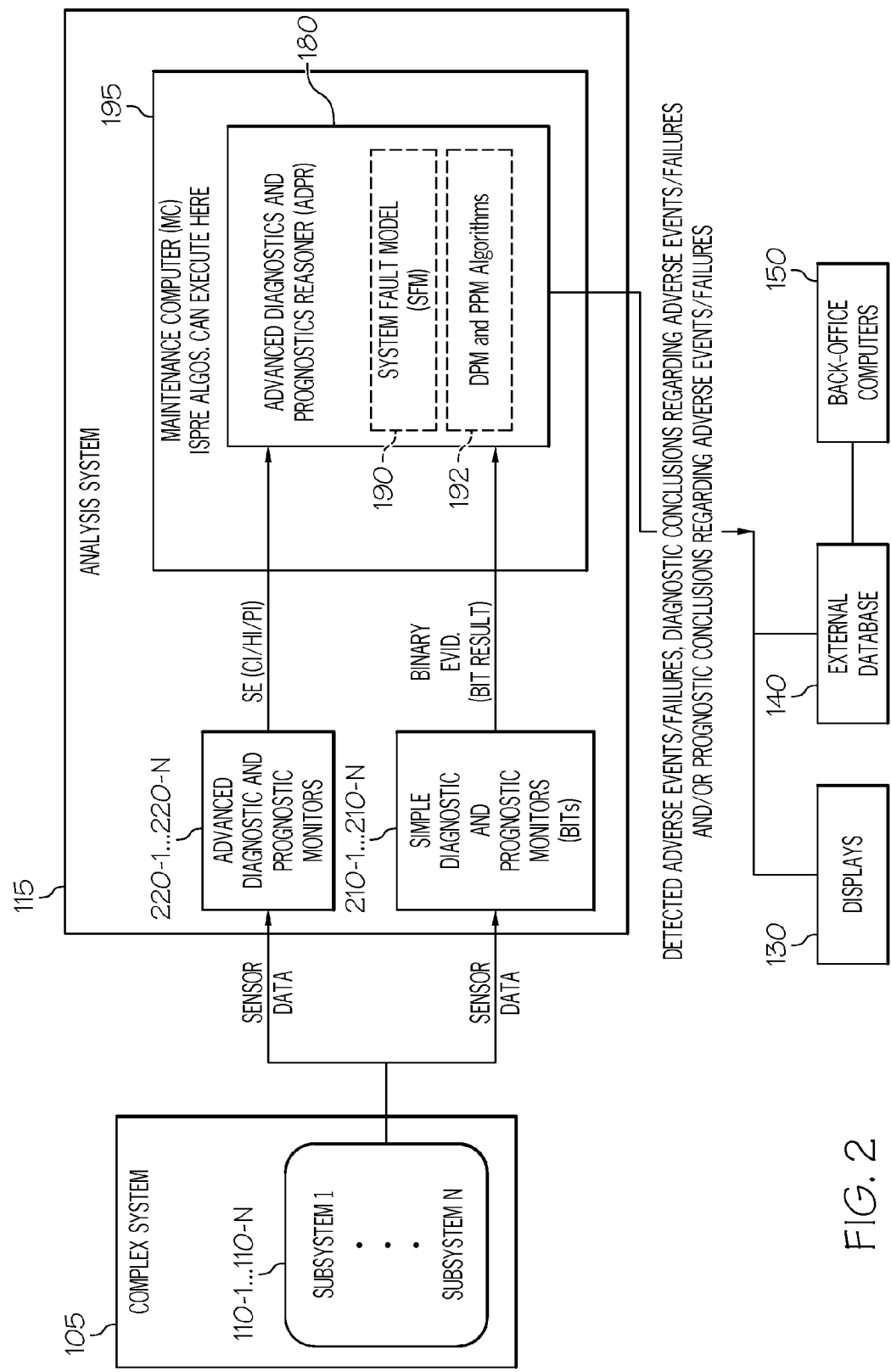
FIG. 2 is a block diagram that illustrates a complex system and analysis system in accordance with some of the disclosed embodiments.

FIG. 2 is a block diagram that illustrates a complex system 105 and analysis system 115 in accordance with some of the disclosed embodiments.

The complex system 105 can be any complex system that includes a number of subsystems 100. The disclosed embodiments can be implemented within any complex system that includes subsystems. Examples of complex systems include, for example, a building, a plant (e.g., power station), vehicles (e.g., ships, aircraft, spacecraft, tanks, etc.).

As in FIG. 1, the complex system 105 includes a number (1 . . . N) of subsystems 110, and each subsystem 110 includes one or more sensors or other monitors (not shown). Each sensor/monitor can generate sensor data that is used by the analysis system 115. In general, a "sensor" is a device that measures a physical quantity and converts it into a signal which can be read by an observer or by an instrument. In general, sensors can be used to sense light, motion, temperature, magnetic fields, gravity, humidity, vibration, pressure, electrical fields, sound, and other physical aspects of an environment. Non-limiting examples of sensors can include acoustic sensors (e.g., sound, microphone, seismometer, accelerometer, etc.), vibration sensors, vehicle sensors (e.g., air speed indicator, altimeter, attitude indicator, gyroscope, inertial reference unit, magnetic compass, navigation instrument sensor, speed sensors, throttle position sensor, variable reluctance sensor, viscometer, wheel speed sensor, Yaw rate sensor, etc.), chemical sensors/detectors, electric current sensors, electric potential sensors, magnetic sensors, radio frequency sensors, environmental sensors, fluid flow sensors, position, angle, displacement, distance, speed, acceleration sensors (e.g., accelerometer, inclinometer, position sensor, rotary encoder, rotary variable differential transformer, tachometer, etc.), optical, light, imaging sensors (e.g., charge-coupled device, infra-red sensor, LED, fiber optic sensors, photodiode, phototransistors, photoelectric sensor, etc.), pressure sensors and gauges, strain gauges, torque sensors, force sensors piezoelectric sensors, density sensors, level sensors, thermal, heat, temperature sensors (e.g., heat flux sensor, thermometer, resistance-based temperature detector, thermistor, thermocouple, etc.), proximity/presence sensors, etc.

The analysis system 115 includes a number of advanced diagnostic and prognostic monitors (ADPMs) 220-1 . . . 220-N, a number of simple diagnostic and prognostic monitors (SDPMs) 210-1 . . . 210-N, and a maintenance computer (MC) 195 that communicates with the ADPMs 220 and SDPMs 210. As used herein, the term "diagnostic" means "serving to identify a particular failure mode." As used herein, the term "prognostic" means "serving to predict the occurrence of a particular failure mode along with an estimate of the time until the occurrence." As will be described in greater detail below, the MC 195 can collect various binary and complex evidence signals generated by the SDPMs 210 and the ADPMs 220, respectively, analyze these evidence signals per the diagnostic and prognostic reasoning algorithms, and then produce diagnostic conclusions about adverse events that are occurring in the system 105 and/or prognostic conclusions about adverse events that may occur in the near future. These conclusions can be presented to a user using appropriate displays 130 and/or downloaded to a computer 140/150 for maintenance decision making.

As described above, with reference to FIG. 1, each SDPM 210 can receive sensor data from one or more of the subsystems 110, and executes a built-in-test (BIT) on that sensor data to interpret the sensor data and generate a BIT result. Each BIT result is evidence that is binary in nature (e.g., yes/no, on/off, 1/0, etc.) or "binary evidence (BE)" of a sensed event.

Each ADPM 220 can receive sensor data from one or more of the subsystems 110. Each ADPM 220 includes advanced diagnostic and prognostic algorithms designed to identify, based on sensor data from subsystems, "complex adverse events" such as those noted above, and to generate additional types of "complex evidence (CE)" of a sensed event (or events) based on the sensor data. This CE can arise from any subsystem and in this sense is "agnostic." In some implementations, the output signal from a single sensor can be processed to generate complex evidence. An example is a non-linear transform of sensor output signal followed by some other mathematical operation. In other implementations, the output signals from multiple sensors can be processed to generate complex evidence. In either case, the CE has more sophisticated mathematical properties in comparison to simple binary evidence of a sensed event. In other words, its mathematical properties are more sophisticated than can be described by simple built-in-test (BIT) or binary results. As will be described below with reference to FIG. 3, the complex evidence generated by each of the ADPMs 220 can be categorized as being: condition indicators (CIs) 224, health indicators (HIs) 228, and/or prognostic indicators (PIs) 232.

The BE generated by each the SPDMs 210 and the CE generated by each of the ADPMs 220 are provided to an advanced diagnostics and prognostics reasoner (APR) module 180 of the MC 195 as an input signal.

As used herein, the term "failure mode" refers to a physical phenomena caused by adverse events (e.g., a physical defect) that degrade functionality of the complex system 105 such that it no longer meets one or more specified requirements. A failure mode can be represented internally in the analysis system 115. This internal representation is also referred to as a "failure mode."

As used herein, the term "fault condition" refers to a software entity or structure that provides a "variable" representation of an underlying failure mode that is occurring in a complex system. A fault condition may be constructed without knowing which of several failure modes is actually occurring. A fault condition is designed to hold the binary and/or complex evidence, an ambiguity set/group, etc. The terms ambiguity set and ambiguity group are used interchangeably herein and will oftentimes be described as an ambiguity set/group. An ambiguity set/group is a set of failure modes (usually more than one) that cannot be resolved, where a particular failure mode in the ambiguity set/group that is causing the fault condition is unknown. Any failure mode in the set/group that makes up the ambiguity set/group can be the cause of the fault condition. Each of the failure modes in the ambiguity set/group has a unique probability of being the actual failure mode that is occurring in the complex system. These probabilities can be different from each other and may be unknown to the analysis system. For example, in the ambiguity set/group {bent-shaft, chipped-bearing}, the probabilities associated with these failure modes could be 0.1 and 0.8 respectively, making the second (chipped-bearing) the more likely underlying failure mode.

The ADPR module 180 that is designed based on the particular requirements of the system 105. The ADPR module 180 includes a diagnostic processing module 192 (and algorithms), a prognostic processing module 192 (and algorithms), and a system fault model (SFM) 190 that defines the CE and BE in terms of their structure and probabilistic and/or statistical nature, as well as the possible relationships that can exist between BE, CE and failure modes (i.e., adverse events of interest). With these features, the ADPR module 180 defines a mathematical framework designed to process BE and CE to identify, diagnose and prognose adverse events.

The SFM 190 can be created by data mining in an offline analysis. This offline analysis step estimates the unknown parameters in the SFM 190. To create the SFM 190 any of a variety of mathematical techniques can be employed such as clustering, correlation analysis and least squares estimation, etc. Once created, the SFM 190 defines the various relationships that can exist between the CE and BE signals and one or more "failure modes."

At runtime, the ADPR module 180 uses the SFM 190 along with its diagnostic and prognostic processing modules 192 to:

(1) analyze the BE and CE to identify adverse events that are taking place within the complex system 105 (or at one or more of the subsystems 110 of the complex system 105));

(2) diagnose adverse events or failures to generate diagnostic conclusions regarding the adverse events or failures that are taking place within the complex system 105 (or at one or more of the subsystems 110 of the complex system 105); and/or (3) predict (or "prognose") adverse events or failures (i.e., use deductive reasoning to generate prognostic conclusions regarding the adverse events or failures that are predicted to take place within the complex system 105 (or at one or more of the subsystems 110 of the complex system 105 at a future time)). For instance, by using deductive reasoning, the ADPR module 180 can estimate the severity of the adverse events as well as the remaining useful life for the affected subsystems.

In one exemplary implementation, the ADPR module 180 can implement an extension of the W-algorithm, in which the W-algorithm is extended to address propagation of uncertainty as well as the need for active system-level participation in the diagnostic process. The basic W-algorithm combines abductive and deductive reasoning steps, and an example of the W-algorithm is described, for example, in a 1994 publication entitled "*Application of Model-based Diagnostics Technology on the Boeing 777 Airplane,*" IEEE Aero Conf., Big Sky, Mont., by T. Felke, which is incorporated herein by reference in its entirety. In accordance with the extended W-algorithm implementation, a set of evidence (such as BE and CE described above) is associated with a set of failure modes called its ambiguity set/group. The occurrence of any of the failure modes in the ambiguity set/group could have caused the subsystem sensor/monitor to generate this evidence. An abductive step creates a fault condition (FC) and associates the ambiguity set/group with it. Given a fault condition, a deductive step then generates a set of "expected evidence" (i.e., evidence one would expect to see if any of the failure modes in the ambiguity set/group were to occur). A set of evidence (such as BE and CE described above) is associated with each failure mode in the system. Conversely, for each piece of evidence, there may be more than one failure mode that could have generated it. When a piece of evidence is seen by the ADPR module 180, it constructs a FC containing (among other things) the piece of evidence and the set of failure modes that could have caused it. The latter is called the "ambiguity set/group." For each failure mode in the ambiguity set/group, the abductive step constructs the set of evidence that should be seen if that failure mode were occurring and compares that set to what is seen to determine which of the failure modes in the ambiguity set/group is actually occurring. As evidence accumulates, it may indicate that more than one of the failure modes in a FC's ambiguity set/group is occurring, or it may indicate that none of them is occurring. The AP reasoner provides rules for splitting and merging FCs. More than one FC can exist at the same time. By convention, each FC operates individually on the single fault assumption. That is, even though an FC contains an ambiguity set that may consist of many failure modes, exactly one failure mode is assumed to be occurring at any one time. This allows the algorithm to diagnose and predict multiple simultaneous failure modes. The system determines the order for evaluating failure mode hypotheses by explicitly taking into account cascading failure modes (where failure modes can cause other failure modes to occur).

Thus, the ADPR module 180 employs a combination of deductive steps and abductive steps to analyze the network to explain the given set of observed evidence (CEs and BEs). As used herein, an abductive step identifies a minimum set of failure modes, any one of which can explain the given set of evidence. A deductive step formulates the next set of evidence one can expect given a failure mode. The combination of deductive and abductive steps can operate recursively on the stream of CE provided by the ADPMs 220 (and/or BE provided from the 210) to calculate a most likely failure mode.

Figure 3A:
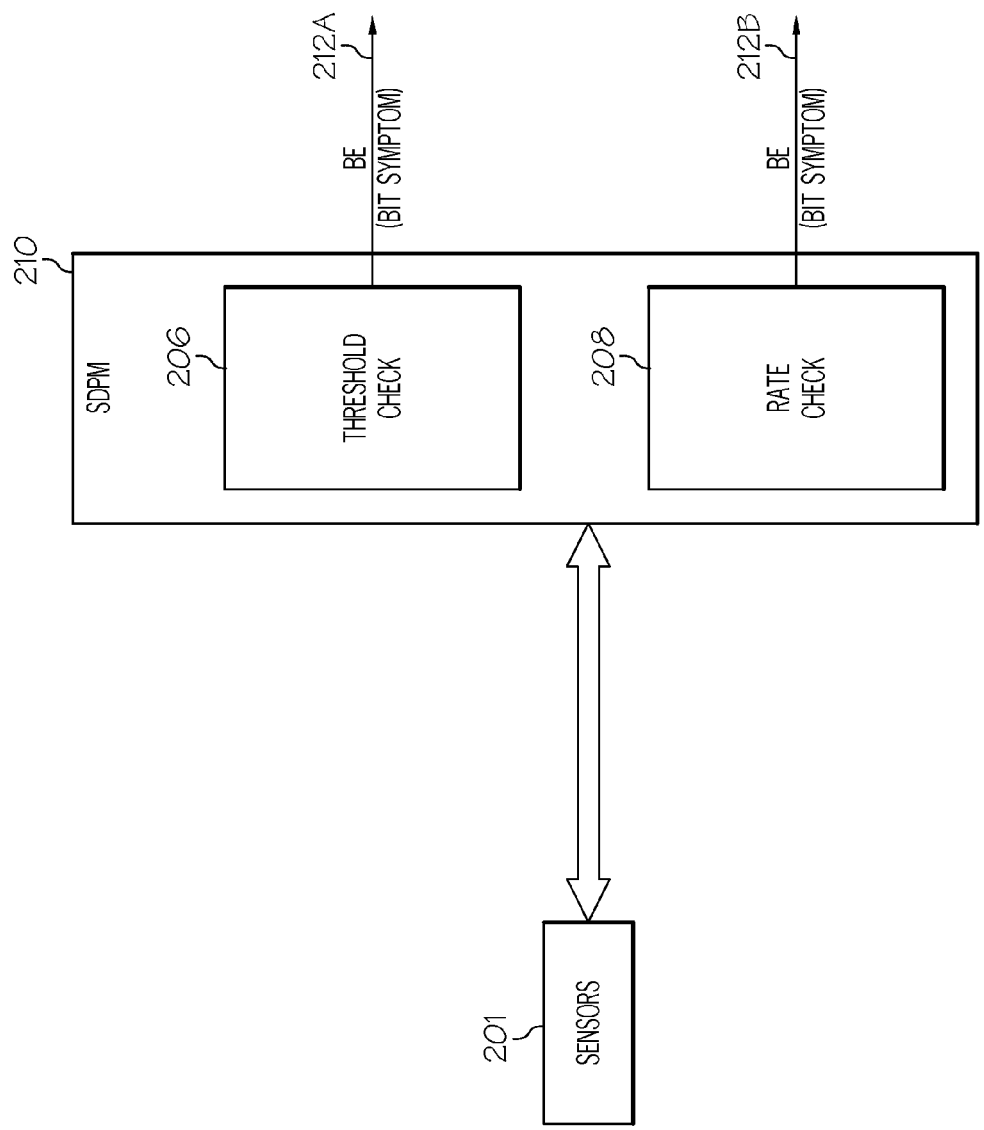
FIG. 3A is a block diagram that illustrates a simple diagnostic and prognostic monitor (SDPM) in accordance with one exemplary implementation of the disclosed embodiments.

FIG. 3A is a block diagram that illustrates a simple diagnostic and prognostic monitors (SDPM) 210 in accordance with one exemplary implementation of the disclosed embodiments. The SDPM 210 receives sensor data 204 from one or more subsystems (not illustrated). The SDPM 210 can then perform simple operations such as threshold checking at block 206 and/or rate checking at block 208. For example, the threshold checking block 206 can compare the sensor data 204 to a threshold, and determine whether it is greater than (or less than) a particular threshold. Based on the result of this comparison, the threshold checking block 206 can generate simple binary evidence 212A (also called also called a BIT symptom, such as a failed BIT). The rate checking block 208 can compare the sensor data 204 to a particular rate threshold, and determine whether it is greater than (or less than) the particular rate threshold. Based on the result of this comparison, the rate checking block 208 can generate simple binary evidence 212B. Although the SDPM 210 in this example can perform threshold checking and/or rate checking, it will be appreciated that the SDPM 210 could perform a wide variety of other simple binary checking, comparison and decision functions such as increasing or decreasing signal, etc.

Figure 3B:
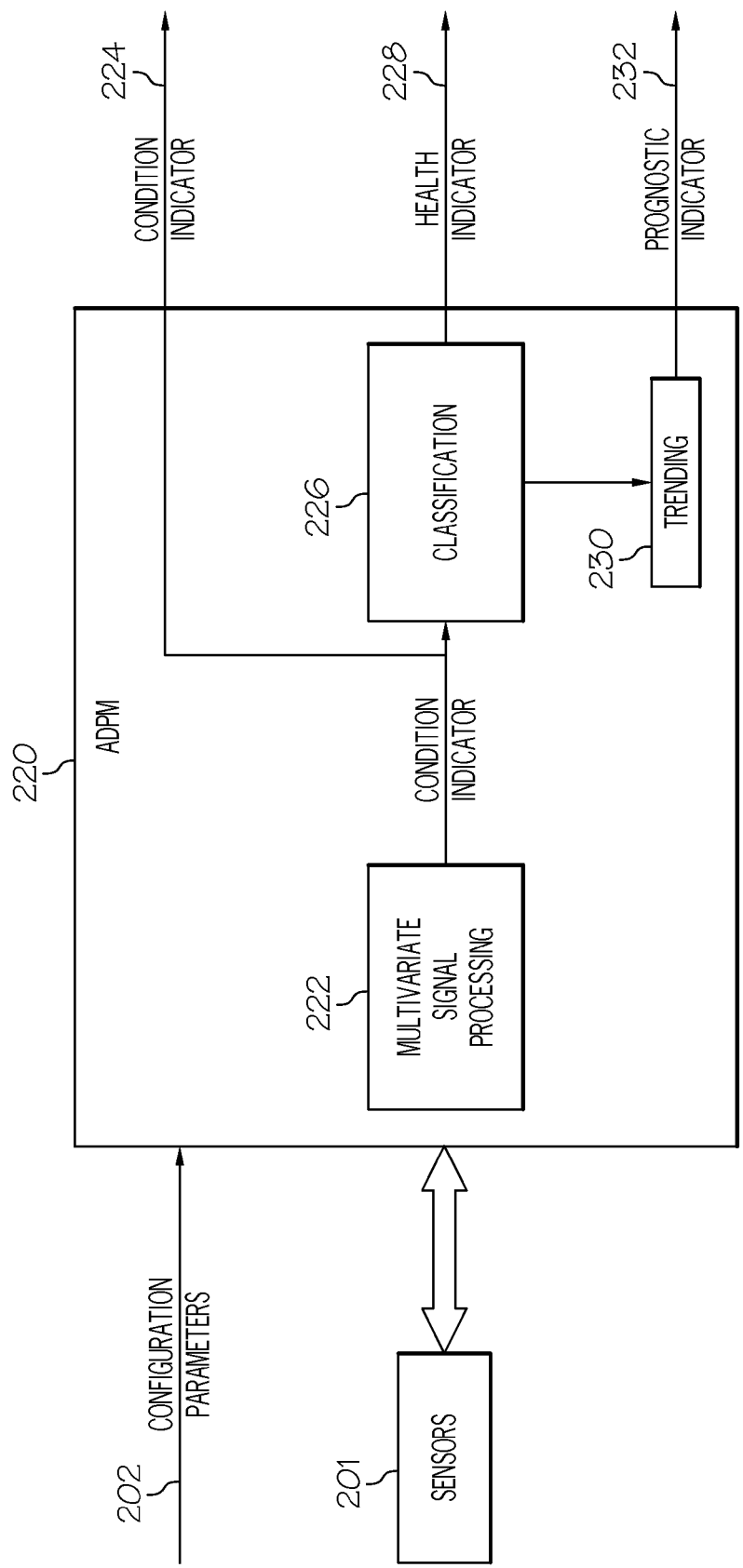
FIG. 3B is a block diagram that illustrates an advanced diagnostic and prognostic monitor (ADPM) in accordance with one exemplary implementation of the disclosed embodiments.

FIG. 3B is a block diagram that illustrates an advanced diagnostic and prognostic monitors (ADPM) 220 in accordance with one exemplary implementation of the disclosed embodiments. The ADPM 220 receives sensor data 204 from one or more subsystems (not illustrated). The ADPM 220 includes a signal processing module 222, a classification module 226 and a trending module 230. The ADPM is configurable via configuration parameters 202 that are applied to the ADPM 220. The signal processing module 222 can perform multivariate signal processing on the sensor data (i.e., sensor data from one or more sensors generated by one or more of the subsystems) to generate a condition indicator 224. The classification module 226 that can perform classification functions with respect to the condition indicator 224 to generate a health indicator 228. The trending module 230 that can perform trending analysis functions with respect to the health indicator 228 to generate a prognostic indicator 232 that indicates a predicted outcome. Although the ADPM 220 in this example can perform signal processing, classification and trending function, it will be appreciated that the ADPM 220 could perform a wide variety of other functions.

As will now be described below with reference to FIG. 4, the indicators 224, 228, 232 output by the ADPM 220 are all forms of CE that can be used by the SFM 190.

Figure 4:
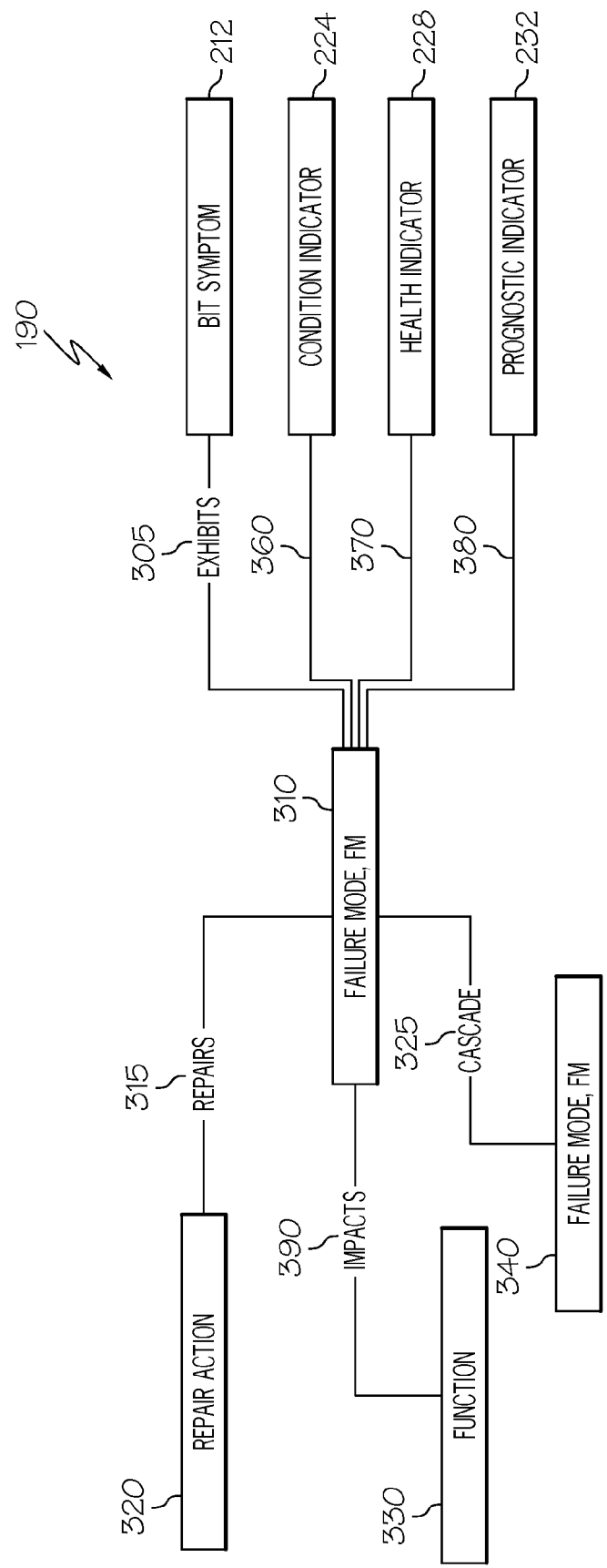
FIG. 4 is a block diagram that illustrates schema used to define an exemplary system fault model (SFM) in accordance with one exemplary implementation of the disclosed embodiments.

FIG. 4 is a block diagram that illustrates schema used to define an exemplary system fault model (SFM) 190 in accordance with one exemplary implementation of the disclosed embodiments. For purposes of illustration, the SFM 190 is represented as a network or a graph of nodes that are interconnected by heterogeneous arcs that represent relationships between classes of objects/nodes. In actual implementation, the SFM provides a way to represent relationships at the ADPR 180. In one exemplary implementation, the SFM 190 can be represented as an XML file containing a number of elements.

The SFM 190 includes entities or elements that are related to a failure mode (FM) 310 to provide the frame of reference for and to support automated system-level reasoning. In this particular, exemplary implementation, the entities/elements include: one or more repair action elements 320, one or more function elements 330, and one or more related failure mode elements 340. In this model, the FM 310 represents a change to the system 105 that degrades its functionality so that it no longer meets its specified requirements. The repair action element 320 represents corrective action for restoring the system back to its original state so that it meets its specified requirements. The optional element 330 represents activities performed by a system or a subsystem. The related failure mode element 340 represents the cascade relationship between failure modes when one failure mode causes another one (i.e. failure modes that are caused by other failure modes). For example, a broken chain swings and rubs against part and causes it to erode. The SFM 190 also defines complex failure mode-evidence relationships among the various elements.

BIT evidence 212 is evidence generated by failed or successful built-in-test (BIT). For example, BIT evidence is usually generated by performing rate checking and threshold checking with respect to a univariate signal generated by a sensor/monitor for a particular subsystem to determine whether it exceeds (or falls below) a certain level. As such, BIT evidence 212 is typically in the form of a binary signals (e.g., on/off) and indicates the likely occurrence (or non-occurrence) of one or more failure modes (i.e., implicates an ambiguity set/group of failure modes). A failed BIT is the simplest form of feature extraction and generation of "binary" health indicators. The SFM 190 captures the relationship between the FM 310 and BIT evidence 212 as exhibits 305.

Condition indicators (CIs) 224 are derived parameters or "derived parametric data" that pack more information than is generated by sensors. CIs 224 are used for diagnostic reasoning to generate diagnostic conclusions. CIs 224 provide partial evidence towards an ambiguity group of failure modes. The mathematical format of the relationship (R1) 360 between a CI 224 and the FM 310 can be represented as a low-order polynomial model using an appropriate data mining technique. In mathematical form a CI can be represented within equation (1) as follows:

$$P(FM) = \sum_{i=1}^{n} a_i CI^i, \quad \text{(Equation 1)}$$

where P(FM) is the probability of the failure mode (FM), n is a polynomial order and where $a_i$ are polynomial coefficients.

Health indicators (HIs) 228 are partial (or "partially-summarized") diagnostic conclusions that contain a reference to an ambiguity set/group of failure modes. HIs 228 are used for diagnostic reasoning to generate diagnostic conclusions. HIs 228 provide probabilistic evidence for an ambiguity set/group of failure modes. The mathematical format of the relationship (R2) 370 between a HI 228 and the FM 310 can be captured and represented as a probability density function (P(FM|HI)) using an appropriate data mining technique. The probability density function (P(FM|HI)) represents a parametric or non-parametric function, where FM is FM 310 and where HI is the HI 228. For a parametric probability density function, statistics such as mean and standard deviation can be relevant.

Prognostic indicators (PIs) 232 are partially-summarized evidences that indicate the future evolution of a health indicator. In other words, prognostic indicators (PIs) 232 define the evolution of health indicators over a future time period or "window." PIs 232 can be used for prognostic reasoning to generate prognostic conclusions. Among other constructs, PIs contain Prognostic Vectors (PVs), a set of one or more ordered pair of time and probability that can indicate complex time to failure. An example of Prognostic Vectors (PVs) are, for example, in a publication entitled "Distributed Multi-Algorithm Diagnostics and Prognostics for US Navy Ships," *Information Refinement and Revision for Decision Making: Modeling for Diagnostics, Prognostics, and Prediction* (papers from the 2002 AAAI Spring Symposium), K. Goebel and P. Bonissone editors, AAAI Press, 2002, by Hadden, G., et al., which is incorporated herein by reference in its entirety. The mathematical format of the relationship (R3) 380 between a PI 232 and the FM 310 can be represented as a time series auto regression model using an appropriate data mining technique. In mathematical form, a PI can be represented within equation (2) as follows:

$$P(FM) = \sum_{k=0}^{n} a_i PI(t-k),$$ (Equation 2)

where P(FM) is the probability of the failure mode (FM), n is a lag order, $a_i$ are lag coefficients, t is time and k is k steps from 0 to n in the summation.

The SFM 190 also captures various relationships between the FM 310 and other SFM elements 320, 330, 340 that are related to the FM 310 including: repairs element 315 between the FM 310 and repair action 320, impacts element (R4) 390 between the FM 310 and the optional element 330, and cascades 325 between FM 310 and related failure mode 340. The mathematical format of the impacts relationship (R4) 390 between a system (or sub-system) of interest 340 and the FM 310 can be represented as a binary 0/1 number that is assigned by domain experts using an appropriate data mining technique.

One exemplary non-limiting implementation of the system 105 of FIG. 2 will now be described with reference to FIG. 5, where the system is a vehicle, and the analysis system 115 is an Integrated Vehicle Health Management (IVHM) system. As used herein, the term "vehicle" broadly refers to a non-living transport mechanism. Examples of such vehicles include mechanical air vehicles including aircraft and spacecraft, automobiles, mechanical water vehicles including boats and ships, mechanical under-water vehicles including submarines, mechanical rail vehicles such as trains, trams and trolleys, etc.

Figure 5:
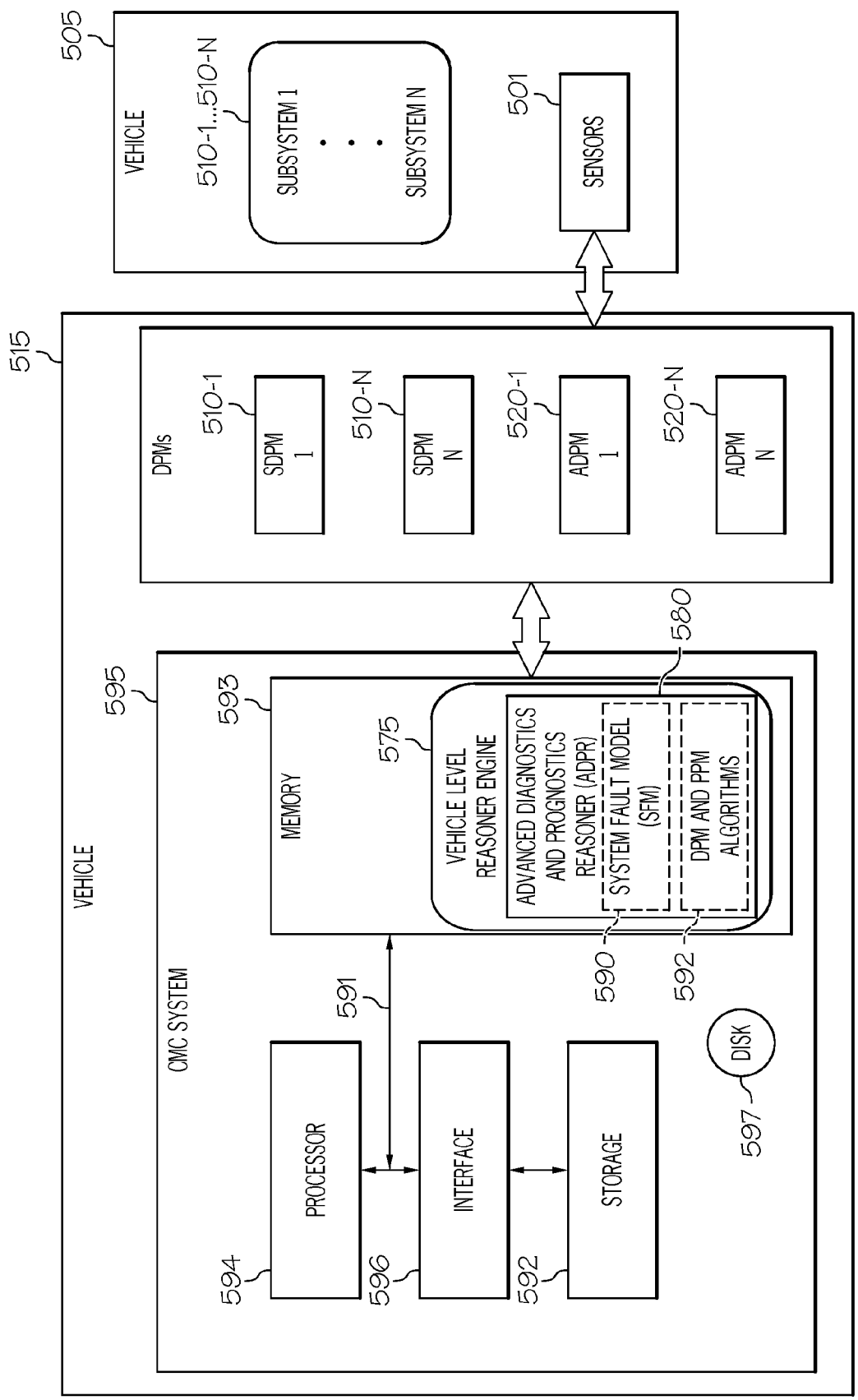
FIG. 5 is a functional block diagram of an Integrated Vehicle Health Management (IVHM) system that is used with a vehicle in accordance with an exemplary embodiment.

FIG. 5 is a functional block diagram of an Integrated Vehicle Health Management (IVHM) system 515 that is used with a vehicle 505 in accordance with an exemplary embodiment. In the depicted embodiment, the IVHM system 515 includes a central maintenance computer (CMC) system 595 and a plurality of diagnostic and prognostic monitors 510, 520, while the vehicle 505 includes a plurality of vehicle subsystems 510-1 . . . 510-N each having one or more sensors 501. However, this may vary in other embodiments. In one exemplary implementation, where the vehicle is an aircraft, the vehicle subsystems 510 can include, for example, propulsion subsystems, fuel control subsystem, lubrication subsystems, environment control subsystems, landing subsystems, ground proximity monitoring subsystems, aircraft actuator subsystems, airframe subsystems, avionics subsystems, flight control subsystems, software subsystems, etc.

The one or more sensors 501 are preferably coupled to the vehicle and/or one or more components or systems thereof. The sensors 501 can facilitate generation of data pertaining to operation of one or more systems and/or sub-systems of the vehicle 505, to assist in performing diagnostics and health monitoring of one or more systems and/or sub-systems of the vehicles. The sensors 501 can be coupled to SDPM(s) 510 and ADPM(s) 520, as described above, and can also be coupled to the computer system 595. Output data from the sensors 501 is provided to SDPM(s) 510 and/or ADPM(s) 520, and in the case of ADPM(s) 520 can be used to generate complex evidence (CE), as described above. Operational details of the SDPM(s) 510 and ADPM(s) 520 are described above and for sake of brevity will not be repeated here. The ADPMs 520 incorporate intelligent data collection modules that allow them to take an active role in the diagnostic process by querying the appropriate subsystem. Among other things, the ADPMs 520 can identify adverse events caused by fast progression and intermittent faults arising, for example, from the propulsion and aircraft actuator subsystems that cannot be identified using existing reasoning algorithms. The ADPMs 520 can also identify adverse events caused by cascading faults and fast progression faults arising from avionics and software subsystems that cannot by detected by passive aggregation of available data.

In the context of an aircraft, examples of CIs might include, for example, evidence provided by engine compressor efficiency and spectral energy content from a vibration signal. Examples of HIs could be engine inlet loss evidence, which may implicate inlet filter, compressor rub, or a foreign object damage (FOD) incidents. Examples of PIs could include, for example, temperature margin trend evidence shows the evolution of engine health for the next 100 hours of a specific mission.

As depicted in FIG. 5, the computer system 595 includes a computer bus 591, a storage device 592, a memory 593, a processor 594 and a computer interface 596. The processor 594 performs the computation and control functions of the computer system 595, and may comprise any type of processor 594 or multiple processors 594, single integrated circuits such as a microprocessor, or any suitable number of integrated circuit devices and/or circuit boards working in cooperation to accomplish the functions of a processing unit. In one particular implementation, the CMC system 595 can include an on-board Central Maintenance Computer (CMC), sometimes called central airborne computer (CAC), such as those used in Boeing 777 and Boeing 787 aircraft.

The memory 593 stores one or more vehicle health monitoring programs to facilitate conducting health monitoring one or more sub-systems of the vehicle and/or facilitating operation of the IVHM system 515 and/or various components thereof, such as those described above. In one implementation, the memory 593 includes executable code for implementing a vehicle level reasoner engine 575 that executes an ADPR module 580 that includes one or more system fault model(s) 590. An open interface 596 allows the vehicle level reasoner engine 575 to take advantage of the ADPMs 520 and information from the various subsystems 510. As will be described below with reference to FIG. 7, the ADPR module 580 and SFMs 590 can be designed by determining where the reasoning functions are computationally distributed within the vehicle, and then designing the ADPR module 580 and SFM(s) 590 to identify, diagnose and prognose adverse events taking place in the vehicle. The ADPR module 580 manages the propagation of uncertainty through a reasoning process to fuse a wide variety of heterogeneous, partial, and uncertain conclusions arising from multiple subsystems. This fusion can be achieved by incorporating probabilistic elements within the diagnostic processing module/algorithms 592 and prognostic processing module/algorithms 592 that are implemented at the ADPR module 580.

The memory 593 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 593 may be a single type of memory component, or it may be composed of many different types of memory components. In addition, the memory 593 and the processor 594 may be distributed across several different computers that collectively comprise the computer system 595. For example, a portion of the memory 593 may reside on a computer within a particular apparatus or process, and another portion may reside on a remote computer.

During operation, the processor 594 executes the ADPR module 580 and SFM(s) 590 preferably stored within the memory 593. The output of the ADPR module 580 is preferably coupled with a computer-readable signal bearing media bearing the product. For example, in certain exemplary embodiments, one or more program products may include an operational support system and architecture, such as the systems and architectures described above. Such program products may reside in and/or be utilized in connection with any one or more different types of computer systems 595, which can be located in a central location (e.g., on-board the vehicle) or dispersed and coupled via wired or wireless communications to various other different types of networks. In certain other exemplary embodiments, one or more program products may be used to implement an operational support system and architecture. For example, in certain such exemplary embodiments, the one or more program products may be used to operate the various components of the IVHM system 515, to connect such components, or to control or run various steps pertaining thereto in order to facilitate processes for supporting decision-making with respect to the vehicle system, based on various data and output.

The computer bus 591 serves to transmit programs, data, status and other information or signals between the various components of the computer system 595. The computer bus 591 can be any suitable physical or logical means of connecting computer systems 595 and components. This includes, but is not limited to, direct hard-wired connections, fiber optics, and infrared and wireless bus technologies.

The computer interface 596 allows communication to the computer system 595, for example from a system operator and/or another computer system, and can be implemented using any suitable method and apparatus. It can include one or more network interfaces to communicate to other systems or components, one or more terminal interfaces to communicate with technicians, and one or more storage interfaces to connect to storage apparatuses such as the storage device 592.

The storage device 592 can be any suitable type of storage apparatus, including direct access storage devices 592 such as hard disk drives, flash systems, floppy disk drives and optical disk drives. In one exemplary embodiment, the storage device 592 is a program product from which memory 593 can receive a vehicle health monitoring program that at least facilitates performing vehicle health monitoring on a system of a vehicle, or that facilitates operation of the IVHM system 515 or components thereof. The storage device 592 can comprise a disk drive device that uses disks 597 to store data. As one exemplary implementation, the computer system 595 may also utilize an Internet website, for example for providing or maintaining data or performing operations thereon.

It will be appreciated that while this exemplary embodiment is described in the context of a fully functioning computer system 595, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

Although not illustrated, the system 515 can include various other displays, such as cockpit displays, external databases, such as, an external off-vehicle database and other systems, devices, and/or units such as additional computer systems and/or components thereof, sensors for determining values pertaining to the vehicle and/or the health and/or operation thereof, and/or one or more transmitters and/or receiver for transmitting, exchanging, and/or receiving information from non-depicted internal and/or external sources pertaining to the vehicle and/or the health and/or operation thereof.

Figure 6:
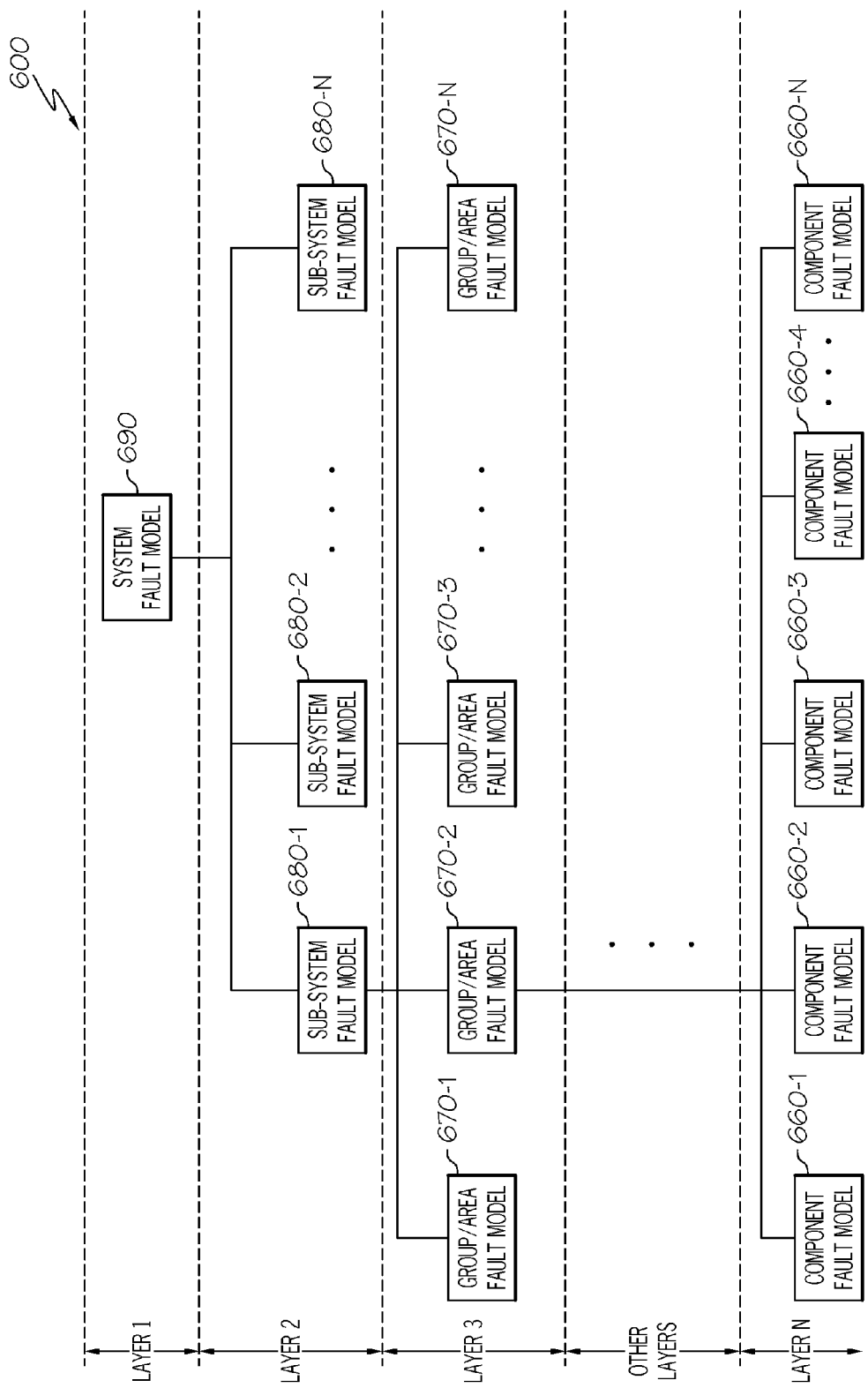
FIG. 6 is a block diagram of a hierarchical representation of a system fault model in accordance with one embodiment.

FIG. 6 is a block diagram of a hierarchical representation 600 of a system fault model 690 in accordance with one embodiment. The model 600 is designed in a plurality of hierarchical layers (1 . . . N).

For instance, at a lowest layer N, component fault models 660 can be created for various components that make up the system. At another layer (layer 3 in the particular model), logical group/area fault models 670 can be defined. Each logical group/area fault model 670 can include one or more of the component fault models 660 that can be grouped together into a logical group. This way, multiple component fault models 660 for certain groups of components of the system can be included in the same higher level logical group/area fault model.

At another layer (layer 2 in the particular model), subsystem fault models 680 can be defined. Each subsystem fault model 680 can include one or more of the logical group/area fault models 670 grouped together to represent a fault model for a particular subsystem.

At another layer (layer 1 in the particular model), the system fault model 690 can be defined. The system fault model 690 can include one or more of the subsystem fault models 680 grouped together to represent a fault model for that particular subsystem. This way, multiple subsystems can be included in the same higher level system fault model. In one exemplary implementation, the SFM 690 can be represented as an XML file containing a number of elements, where each element corresponds to a block illustrated in FIG. 6, where each block illustrated in FIG. 6 is represented as a XML file.

It will be appreciated that the hierarchical representation 600 of the system fault model 690 is one particular non-limiting example. Thus, although the system fault model 690 is illustrated as including four layers in this particular example, it will be appreciated that in other embodiments fewer or more than four layers can be used to create a particular system fault model 690. Similarly, although in this particular example one of the particular subsystem fault models 680-1 is illustrated as including four logical group/area fault models 670, it will be appreciated that in other embodiments, a particular subsystem fault model 680-1 may include fewer or more than four logical group/area fault models 670. Likewise, although in this particular example one of the particular logical group/area fault models 670-2 is illustrated as including five component fault models 660, it will be appreciated that in other embodiments, a particular logical group/area fault model 670-2 may include fewer or more than five component fault models 660.

Figure 7:
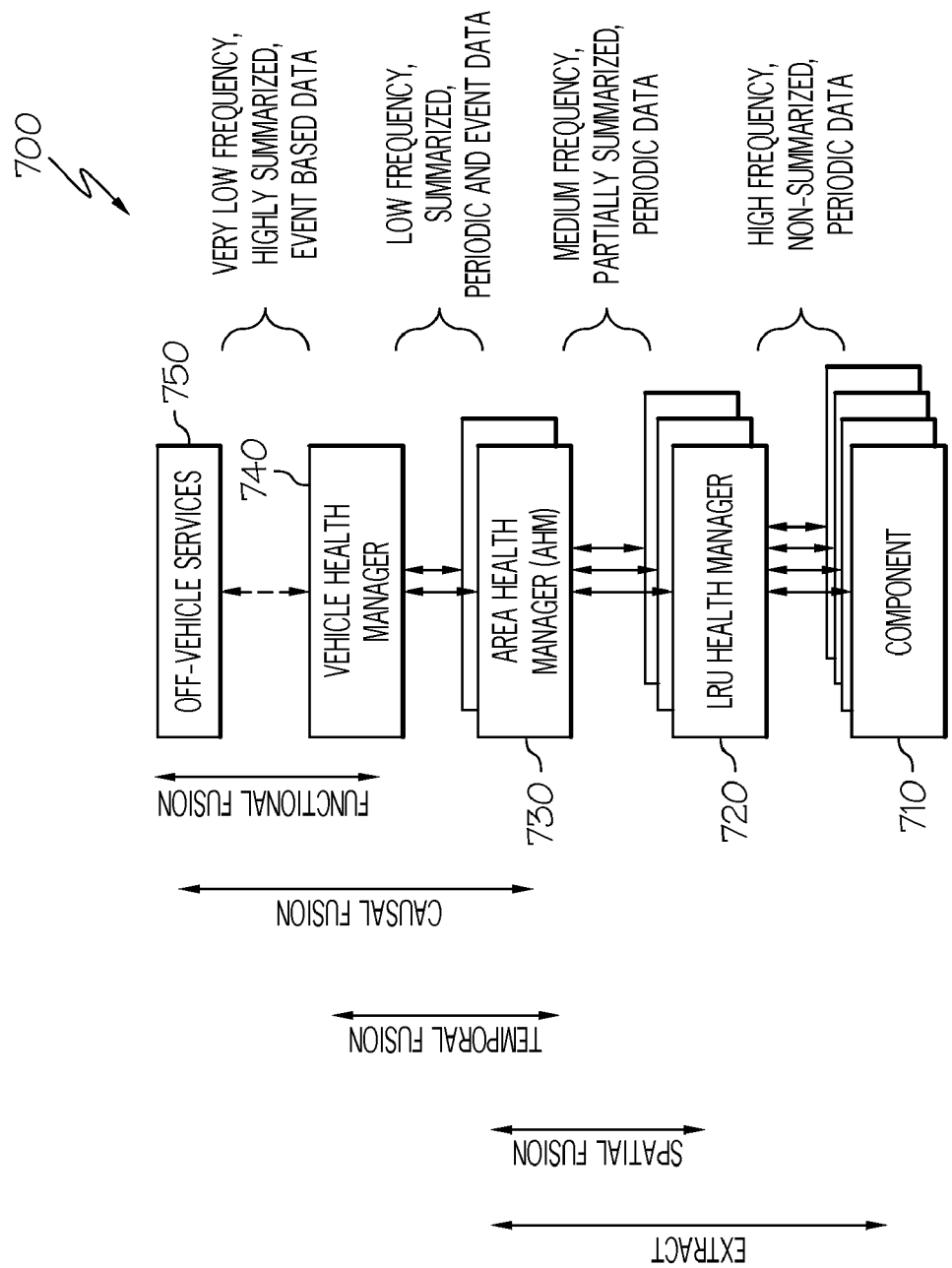
FIG. 7 is a block diagram that illustrates an exemplary layered architecture of an advanced prognostic reasoner (APR) module that is shown in FIG. 5.

FIG. 7 is a block diagram that illustrates an exemplary layered architecture 700 of an ADPR module 580 that is shown in FIG. 5 and designed to operate in a vehicle system. In this particular architecture, the functions of the ADPR module 180 can be logically distributed across five layers. The layered architecture 700 includes a component layer 710, a line replaceable unit (LRU) health management layer 720, an area health management (AHM) layer 730, a vehicle health management (VHM) layer 740 and off-vehicle services layer 750. FIG. 7 illustrates arrows that span multiple layers; these arrows represent various degrees of fusion (spatial, temporal, causal, and functional) can span over a number of logical layers. The flows of information across layers depends on the functions allocated to each layer, which in turn may depend on user requirements/specifications such as communication bandwidth, computational resources, and legacy health monitoring solutions.

In this example, the component layer 710 represents components of the vehicle. The LRU health management layer 720 can represent an electronic control unit attached with an LRU such as propulsion engine, environment control, or landing system. Typically, feature extraction occurs at this layer 720. The AHM layer 730 represents a specific area within an aircraft and may contain some or all of temporal and spatial fusion. The vehicle health management (VHM) layer 740 is a processing layer that sees all the area health managers and may provide some of temporal, causal, and functional fusion. The VHM layer 740 can communicate with the off-vehicle services layer 750. The off-vehicle services layer 750 is a processing layer that can provide functional and causal fusion.

Those of skill would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for analyzing a complex system comprising a number of subsystems, wherein each subsystem comprises at least one sensor designed to generate sensor data, the method comprising:
processing sensor data from at least one of the sensors to generate binary evidence of a sensed event;
processing sensor data from at least one of the sensors to generate complex evidence of a sensed event, wherein the complex evidence has more sophisticated mathematical properties than the binary evidence, wherein the complex evidence comprises at least one of: a condition indicator (CI), a health indicator (HI), and a prognostic indicator (PI);
providing a system fault model (SFM) that defines statistical relationships between binary evidence, complex evidence, and an underlying failure mode (FM) that is occurring in the complex system;
processing via a processer the binary evidence and the complex evidence to identify failure modes taking place within one or more of the subsystems; and
generating, based on the binary evidence and the complex evidence and the SFM, diagnostic conclusions regarding adverse events that are taking place within the complex system, and prognostic conclusions regarding adverse events that are predicted to take place within the complex system.

2. A method according to claim 1, wherein the step of processing sensor data from at least one of the sensors to generate binary evidence of a sensed event, comprises:
receiving a univariate signal comprising sensor data generated by a particular sensor for a particular subsystem; and
executing a built-in-test (BIT) on the sensor data to generate the binary evidence, wherein each instance of binary evidence comprises: BIT evidence generated by a particular built-in-test (BIT).

3. A method according to claim 2, wherein the BIT evidence implicates an ambiguity group of failure modes, and wherein the SFM captures a relationship between the FM and the BIT evidence as an exhibit.

4. A method according to claim 1, wherein the step of processing sensor data from at least one of the sensors to generate complex evidence of a sensed event, comprises the steps of:
receiving a multivariate signal comprising sensor data; and
performing signal processing on the sensor data of the multivariate signal to generate the CI, wherein the CI comprises: derived parametric data that provides partial evidence towards an ambiguity group of failure modes.

5. A method according to claim 4, wherein the mathematical relationship (R1) between the CI and the FM is represented as a low-order polynomial model taking the form:

$$P(FM) = \sum_{i=1}^{n} a_i CI^i,$$

where n is a polynomial order and where $a_i$ are polynomial coefficients.

6. A method according to claim 4, wherein the health indicator (HI) comprises partially-summarized diagnostic conclusions that provide probabilistic evidence for an ambiguity group of failure modes and contain a reference to an ambiguity failure mode set.

7. A method according to claim 6, wherein the mathematical relationship (R2) between the HI and the FM is represented as a probability density function (P(FM|HI)).

8. A method according to claim 6, wherein the prognostic indicator (PI) comprises partially-summarized evidences that indicate a future evolution of the HI over a future time period.

9. A method according to claim 8, wherein the PI comprises:
Prognostic Vectors (PVs) comprising a set of one or more ordered pair of time and probability that indicate complex time to failure.

10. A method according to claim 8, wherein the mathematical format of a relationship (R3) between the PI and the FM is represented as a time series auto regression model taking the form:

$$P(FM) = \sum_{k=0}^{n} a_i PI(t-k),$$

where n is a lag order, $a_i$ are lag coefficients, t is time and k is k steps from 0 to n in the summation.

11. A method according to claim 1, wherein the SFM further comprises a plurality of other elements comprising:
one or more repair action elements, wherein each repair action element represents corrective repair action for restoring the complex system back to an original state in which the complex system the specified requirements, wherein the relationship between the each repair action element and the FM is represented as a corresponding corrective repair action for restoring the complex system back to the original state;
one or more function elements, wherein each function element represents activities performed by a system or a subsystem;
one or more optional elements, wherein the relationship between the each optional element and the FM is represented by impacts between the FM and the optional element, wherein the mathematical format of the impacts between the optional element and the FM can be represented as a binary number; and
one or more related failure mode elements, wherein each related failure mode element represents a cascade relationship between failure modes that are caused by other failure modes, wherein the relationship between the related failure mode element and the FM is represented as a cascade between FM and related failure mode element.

12. A method according to claim 1, wherein the complex system comprises a vehicle and wherein the analysis system comprises an Integrated Vehicle Health Management (IVHM) system.

13. A method according to claim 12, wherein the vehicle comprises: an aircraft or a spacecraft.

14. A system, comprising:
a complex system comprising a number of subsystems each having at least one sensor designed to generate sensor data; and
an analysis system, comprising:
a simple diagnostic and prognostic monitor (SDPM) being designed to process sensor data from at least one of the sensors and generate binary evidence of a sensed event;

an advanced diagnostic and prognostic monitor (ADPM) being designed to process sensor data from at least one of the sensors and generate at least one form of complex evidence of a sensed event, wherein the complex evidence comprises at least one of: a condition indicator (CI), a health indicator (HI), and a prognostic indicator (PI); and a maintenance computer (MC), communicatively coupled to the SDPM and the ADPM, and comprising:

an advanced diagnostics and prognostics reasoner (ADPR) module designed to process the binary evidence and the complex evidence to identify failure modes taking place within one or more of the subsystems of the complex system, wherein the ADPR module comprises:

a system fault model (SFM) that defines probabilistic relationships between binary evidence, complex evidence, and an underlying failure mode (FM) that that is occurring in the complex system;

a diagnostic processing module (DPM) designed to generate, based on the binary evidence and the complex evidence and the SFM, diagnostic conclusions regarding adverse events that are taking place within the complex system; and a prognostic processing module (PPM) designed to generate, based on the binary evidence and the complex evidence and the SFM, prognostic conclusions regarding adverse events that are predicted to take place within the complex system.

15. A system according to claim 14, wherein each SDPM is designed to receive a univariate signal comprising sensor data generated by a particular sensor for a particular subsystem, and to execute a built-in-test (BIT) on the sensor data to interpret the sensor data and generate the binary evidence, wherein each instance of binary evidence comprises:

BIT evidence generated by a particular built-in-test (BIT), wherein the BIT evidence implicates an ambiguity group of failure modes, and wherein the SFM captures a relationship between the FM and the BIT evidence as an exhibit.

16. A system according to claim 14, wherein the SDPM is designed to receive a multivariate signal comprising sensor data, and to perform signal processing on the sensor data of the multivariate signal to generate the CI, wherein the CI comprises: derived parametric data that provides partial evidence towards an ambiguity group of failure modes, wherein the mathematical relationship (R1) between the CI and the FM is represented as a low-order polynomial model taking the form:

$$P(FM) = \sum_{i=1}^{n} a_i CI^i,$$

where n is a polynomial order and where $a_i$ are polynomial coefficients.

17. A system according to claim 16, wherein the health indicator (HI) comprises partially-summarized diagnostic conclusions that provide probabilistic evidence for an ambiguity group of failure modes and contain a reference to an ambiguity failure mode set, wherein the mathematical relationship (R2) between the HI and the FM is represented as a probability density function (P(FM|HI)).

18. A system according to claim 17, wherein the prognostic indicator (PI) comprises partially-summarized evidences that indicate a future evolution of the HI over a future time period, wherein the PI comprises:

Prognostic Vectors (PVs) comprising a set of one or more ordered pair of time and probability that indicate complex time to failure.

19. A system according to claim 18, wherein the mathematical format of a relationship (R3) between the PI and the FM is represented as a time series auto regression model taking the form:

$$P(FM) = \sum_{k=0}^{n} a_i PI(t-k),$$

where n is a lag order, $a_i$ are lag coefficients, t is time and k is k steps from 0 to n in the summation.

20. A system, comprising:

a vehicle comprising a number of subsystems each having at least one sensor designed to generate sensor data; and an Integrated Vehicle Health Management (IVHM) system, comprising:

a plurality of simple diagnostic and prognostic monitors (SDPMs) each being designed to process sensor data from at least one of the sensors and generate binary evidence of a sensed event;

a plurality of advanced diagnostic and prognostic monitors (ADPMs) each being designed to process sensor data from at least one of the sensors and generate at least one form of complex evidence of a sensed event, wherein the complex evidence comprises at least one of: a condition indicator (CI), a health indicator (HI), and a prognostic indicator (PI); and an advanced diagnostics and prognostics reasoner (ADPR) module designed to: process the binary evidence and the complex evidence based on a system fault model (SFM) that defines statistical relationships between binary evidence, complex evidence, and a failure mode (FM) that represents an underlying fault condition that is occurring in the vehicle; identify adverse events taking place within one or more of the subsystems of the vehicle; and generate, based on the binary evidence and the complex evidence and the SFM, diagnostic conclusions regarding adverse events that are taking place within the vehicle, and prognostic conclusions regarding adverse events that are predicted to take place within the vehicle.

* * * * *